(12) United States Patent
Chen et al.

(10) Patent No.: US 11,004,017 B2
(45) Date of Patent: May 11, 2021

(54) LIBRARY BOOK RESERVATION METHOD BASED ON ULTRAHIGH-FREQUENCY RFID TECHNOLOGY

(71) Applicant: NANJING UNIVERSITY, Nanjing (CN)

(72) Inventors: Lijun Chen, Nanjing (CN); Yuanjie Luo, Nanjing (CN); Qingpu Shi, Nanjing (CN); Linghao Wan, Nanjing (CN); Ying Li, Nanjing (CN); Xi Chen, Nanjing (CN); Afan Zeng, Nanjing (CN); Bin Wang, Nanjing (CN)

(73) Assignee: UNIVERSITY, Nanjing (CN)

( * ) Notice: Subject to any disclaimer, the term of this patent is extended or adjusted under 35 U.S.C. 154(b) by 805 days.

(21) Appl. No.: 15/739,072

(22) PCT Filed: Jun. 29, 2016

(86) PCT No.: PCT/CN2016/087645
§ 371 (c)(1),
(2) Date: Dec. 21, 2017

(87) PCT Pub. No.: WO2017/005127
PCT Pub. Date: Jan. 12, 2017

(65) Prior Publication Data
US 2018/0181887 A1   Jun. 28, 2018

(30) Foreign Application Priority Data
Jul. 3, 2015   (CN) .......................... 201510389001.4

(51) Int. Cl.
*G08B 5/22* (2006.01)
*G06Q 10/02* (2012.01)
(Continued)

(52) U.S. Cl.
CPC ......... *G06Q 10/02* (2013.01); *G06K 7/10366* (2013.01); *G06K 19/0723* (2013.01)

(58) Field of Classification Search
CPC . G06F 21/44; G07C 9/00111; G08B 13/1427; G08B 21/22; G06Q 10/02; G06K 7/10366; G06K 19/0723
See application file for complete search history.

(56) References Cited

U.S. PATENT DOCUMENTS

| 6,184,789 B1 * | 2/2001 | Richley | ..................... G01S 5/16 340/571 |
| 6,704,690 B2 * | 3/2004 | Koh | ........................ G07F 7/069 702/188 |

(Continued)

*Primary Examiner* — Munear T Akki
(74) *Attorney, Agent, or Firm* — CBM Patent Consulting, LLC (57) ABSTRACT

A library book reservation method based on ultra high frequency RFID technology, including the following steps: step 1, using an RFID tag adhered on each book by using an RFID reading device, wherein the information read by the RFID reading device corresponding to each group of books includes ID information id of the tags, collecting the phase difference θ of the current tag, collecting the current time t of the current tag, and using Tag=<id, t, θ> to represent the read information of the RFID reading device corresponding to each group of books; step 2, sorting triples; and step 3, obtaining a phase change rule of the books, establishing a model, and analyzing the position relation between an RFID antenna and the books to sort the books.

3 Claims, 3 Drawing Sheets

(51) Int. Cl.
*G06K 7/10* (2006.01)
*G06K 19/07* (2006.01)

(56) References Cited

U.S. PATENT DOCUMENTS

| | | | |
|---|---|---|---|
| 8,736,447 B2* | 5/2014 | Ehrman | G08B 21/0286 340/568.1 |
| 2008/0302867 A1* | 12/2008 | Holberg | G06Q 30/0224 235/375 |
| 2009/0106037 A1* | 4/2009 | Harindranath | G06Q 50/10 705/342 |
| 2009/0315679 A1* | 12/2009 | Bauchot | G08C 21/00 340/10.1 |
| 2014/0266704 A1* | 9/2014 | Dailey, Jr. | G08B 21/18 340/539.13 |
| 2017/0270471 A1* | 9/2017 | Luo | A47B 63/00 |

\* cited by examiner

LIBRARY BOOK RESERVATION METHOD BASED ON ULTRAHIGH-FREQUENCY RFID TECHNOLOGY

This application is the U.S. national phase of International application Ser. No. PCT/CN2016/087645 filed on 29 Jun. 2016 which designated the U.S. and claims priority to Chinese Application No. CN201510389001.4 filed on 3 Jul. 2015, the entire contents of each of which are hereby incorporated by reference.

FIELD OF THE INVENTION

The present invention relates to the field of ultra high frequency RFID technology, and in particular to a library book reservation method based on ultra high frequency RFID technology.

BACKGROUND OF THE INVENTION

Radio frequency identification (RFID, Radio Frequency Identification) is a noncontact automatic identification technology that automatically identifies objects through wireless signals and obtains relevant data stored therein. The RFID technology, serving as an important perception technology of Internet of Things perception layers, can realize tracking locating and information sharing of a target object after being combined with the computer network technology and the communication technology. The RFID technology has the advantages of non sight line identification, high identification speed, large data storage capacity, high security and the like. The RFID technology has been widely used in warehousing, logistics and other service industries to greatly improve the management and operation efficiency therefore, and thus becoming an important intelligent infrastructure. At present, the RFID technology is divided into two kinds of high frequency and ultra high frequency, with the maturity of the ultra high frequency RFID technology and the decrease of tag prices, the ultra high frequency RFID technology has also started to be used in the field of libraries. The ultra high frequency RFID technology has brought about revolutionary changes in the field of libraries, such as inquiring and locating books, and quick self-service borrowing and other services start to serve borrowers. The book locating function is particularly important, which greatly shortens the time spent by the borrowers in finding the books in the libraries, and the realization of this function requires accurate library book reservation information, and regular book reservation work can guarantee the accuracy of the library book reservation data.

Currently, most libraries still use barcodes for book management, which poses a tremendous challenge to book reservation: 1, only one bar code can be identified at one time, and the library has a large collection of books, so that the workload of librarians is very large; and 2, the bar code scanning requires to be within the scope of sight, and the bar codes are generally adhered in books in order to protect the bar codes, therefore the books need to be opened during book reservation. When the barcodes are used for managing the books, the workload of book reservation is very large, and a lot of requirements are proposed for the librarians. The ultra high frequency RFID technology brings a lot of convenience for the libraries, so that fast library book reservation becomes a reality. However, the following problems still exist: 1, due to the wide range of the ultra high frequency RFID technology and an indoor multipath effect, it is easy to read other bookshelves and other books in the present shelf during library book reservation, and thus the purpose of accurate book reservation cannot be achieved; 2, the existing book reservation can only achieve a reservation granularity with a layer as the unit and cannot achieve the granularity with a book as the unit, that is, the books reserved on each layer cannot be sorted. Therefore, in general, the library book reservation work takes a lot of manpower to complete.

SUMMARY OF THE INVENTION

Objective of the invention: the technical problem to be solved by the present invention is to provide a library book reservation method based on ultra high frequency RFID technology in view of the shortcomings in the prior art. The arrangement sequence of each layer of books in a library is automatically identified by using a radio frequency phase in the ultra high frequency RFID technology.

In order to solve the above technical problems, the present invention discloses a library book reservation method based on ultra high frequency RFID technology, including a method for eliminating books not in the present layer on a bookshelf based on the change rate of a radio frequency phase, and a method for sorting books based on a time-varying change rule of the radio frequency phase, and the specific steps are as follows:

step 1, using an RFID tag adhered on each book by using an RFID reading device, wherein the information read by the RFID reading device corresponding to each group of books includes ID information id of the tags, collecting the phase difference $\theta$ of the current tag, correcting the current time t of the current tag, and using Tag=<id, t, $\theta$> to represent the read information of the RFID reading device corresponding to each group of books;

step 2, preprocessing the information in the triple Tag; and step 3, obtaining a phase change rule of the books, establishing a model, and analyzing the position relation between an RFID antenna and the books to sort the books.

Step 2 includes:

step 2-1, dividing the triples into different subsets according to different id, so that the ID information of the tags in each subset is consistent;

step 2-2, obtaining the minimum value of t from all the triples, subtracting the minimum value from the time t of each triple, obtaining time differences, and sorting the triples in each subset according to the time differences from small to large.

Step 3 includes:

step 3-1, for the triples in each sorted subset, calculating change rates of phase differences in sequence, selecting A phase differences having the maximum change rate, wherein A is a natural number, and using an arithmetic mean of the change rates of the A phase differences as the phase difference change rate of the subset, that is, the ID information of the tag is the phase difference change rate of the tag; in the present invention, 5 phase differences with the maximum change rate are selected, when a fewer number of phase differences are selected, there is certain occasionality, when too many phase differences are selected, the effects are not distinguished obviously, experiments prove that 5 is an optimal number, the arithmetic mean of the change rates of the 5 phase differences is used as the phase difference change rate of the subset, that is, the phase difference change rate of the tag with the ID information id;

step 3-2, calculating the phase difference change rates of all the subsets, when the phase difference change rate is smaller than a set threshold, dividing the belonging book as the book in other layers of a bookshelf, eliminating the book, otherwise, dividing the book as the book in the present layer, and retaining the book, wherein the threshold can be set as the arithmetic mean of all the phase difference change rates;

step 3-3, in the divided present layer book data, for each subset, obtaining a time period in which the phase difference change rate is smaller than the set threshold according to the phase difference change rates calculated in step 3-2, and using a median of the time period as a time $T_1$;

step 3-4, for the data in each subset, for the segment of the phase difference which increases with time, the value changes from increasing to decreasing, that is, the phase difference progressively increases from 0 to the maximum value of P (P ∈ (0, 2π), and then progressively decreases from the maximum value of P to 0, performing quadratic curve fitting by using the least square method, and calculating the time $T_2$ where the highest point is located according to the fitted curve;

step 3-5, for all the triple data in each subset, calculating a weighted average time $T_3$ of the phases;

step 3-6, determining the final time T by using weight coefficients $\alpha_1, \alpha_2, \alpha_3$:

$$T = \alpha_1 * T_1 + \alpha_2 * T_2 + \alpha_3 * T_3,$$

$$\alpha_1 + \alpha_2 + \alpha_3 = 1,$$

wherein, $0 < \alpha_1 \alpha_2, \alpha_3 < 1$, the books are sorted according to the time T, and the book having the minimum value of the time T is arranged at the headmost, and then the books are sorted according to the T values from small to large.

The present invention introduces the phase into the field of library book reservation for the first time, and realizes the library book reservation accurately. Therefore the borrowers can easily and quickly find the to-be-borrowed books. Another objective of the present invention is to sort each layer of checked books so as to accurately locate the position of each book and facilitate the borrowers.

Beneficial effects: by the adoption of the method, the books not on the present layer can be eliminated, the purpose of only reading the books on the present layer is achieved, and the problem of multi-reading in library checking is solved; and by the adoption of the method, the objective of sorting the books on the present layer is achieved, the position of each book can be accurately located, and thus the library book reservation is improved.

BRIEF DESCRIPTION OF THE DRAWINGS

The present invention will be further described below with reference to the accompanying drawings and specific embodiments, and the advantages of the foregoing and/or other aspects of the present invention will become clearer.

DETAILED DESCRIPTION OF THE EMBODIMENTS

Embodiment 1

The RFID reader transmits electromagnetic waves through an antenna, the electromagnetic waves are reflected by an RFID tag after arriving at the tag, and the RFID reader identifies the RFID tag by receiving the reflected electromagnetic waves. The transmitted electromagnetic waves have initial transmitting phases, the reflected receiving electromagnetic waves have receiving phases, and in the present embodiment, the book reservation of a library is realized by the phase differences of the transmitting phases and the receiving phases. At present, an Impinj reader R420 can provide identification support for the phase differences, and the present embodiment is implemented by using the Impinj reader R420. According to the information provided by Impinj Company, and the change rule of the phase differences with the distance is as follows:

$$\theta = \left(-\frac{2\pi}{\lambda} \times 2d + \delta\right) \bmod 2\pi \quad (1)$$

wherein, θ represents the phase difference, d represents the distance, that is, the distance between the reader antenna and the tag, λ represents the wavelength of the electromagnetic wave, and δ represents other influence factors. The phase difference θ has a periodic change rule with the distance, and the change period is 2π.

Figure 1:
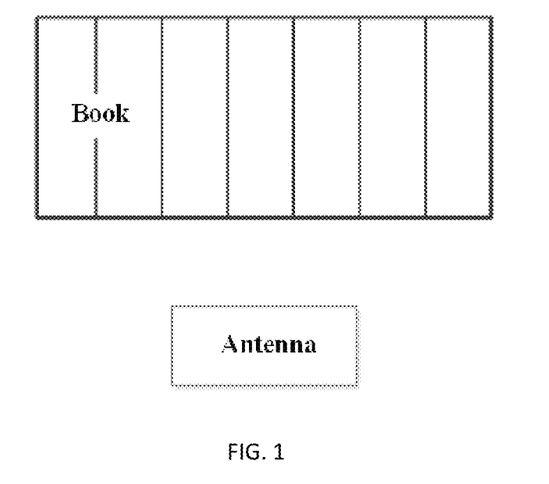
FIG. 1 is a position relationship diagram between an antenna and a bookshelf.

The books in the library are generally neatly placed, during book reservation, the antenna generally passes through the book and is in parallel to the book, and the top view is as shown in FIG. 1.

The antenna moves firstly from far to near and then moves from near to far on a direction parallel to the book, and obtains the phase difference θ of the book in the moving process. Through theoretical analysis and experiments, the change of phase difference along time is of a rule as shown in FIG. 2.

Figure 2:
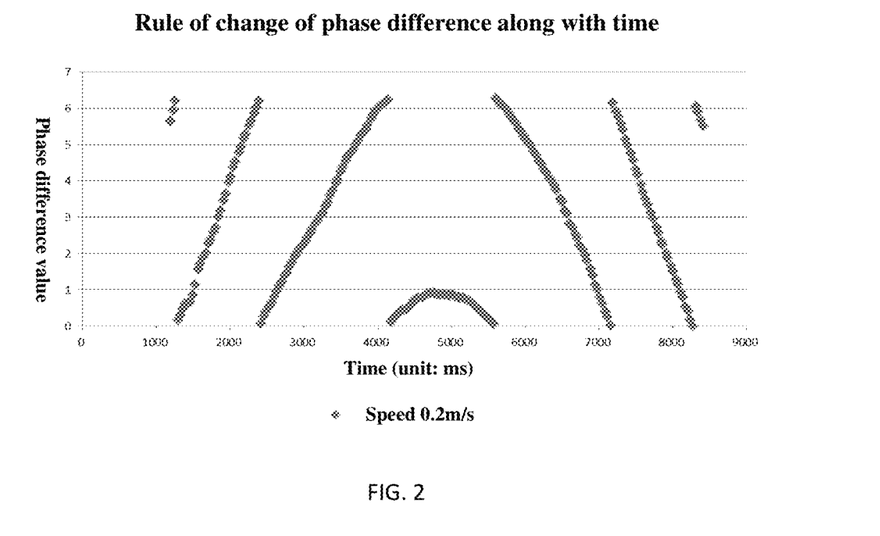
FIG. 2 is a time-varying diagram of a phase difference.

The following conclusions can be drawn from FIG. 2:

1. The phase difference is in a periodic progressive increase trend from far to near; the phase difference is in a periodic progressive decrease trend from near to far; and the phase difference is in a symmetrical change trend on the whole.

2. When the distance between the antenna and the tag is further, the change rate of the phase difference with time is greater; and when the distance between the antenna and the tag is smaller, the change rate of the phase difference with time is smaller.

Figure 3:
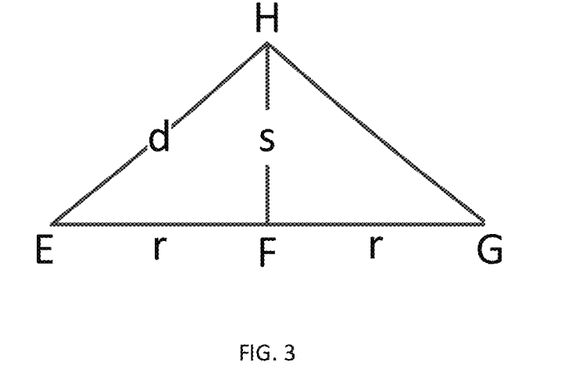
FIG. 3 is a relative position diagram of the antenna and a book.

A model is established according to the position relation between the reader antenna and the book, and in order to describe the model more clearly, the situation of one book is only described, and the top view is as shown in FIG. 3:

H represents a book adhered with the tag, the antenna moves from a point E to a point G at a constant speed, the point E and the point G are relative to a point F, wherein the lengths of EF and FG are respectively r, the HF is vertical to EG, the length of HF is s, which represents a vertical distance between the antenna and the bookshelf. The length of the EH is d, which represents a real distance between the antenna and the tag, with the movement of the antenna, the real distance changes continuously. It is assumed that the center of the tag and the center of the reader antenna are located on the same height; and the moving speed of the reader antenna is v. The real distance d changes with the time t as follows:

$$d(t) = \begin{cases} \sqrt{s^2 + (r - vt)^2}, & 0 \leq t \leq \frac{r}{v} \\ \sqrt{s^2 + (vt - r)^2}, & \frac{r}{v} < t \leq \frac{2r}{v} \end{cases} \quad (2)$$

When the center of the tag and the center of the reader are not at the same height, the absolute value of the height difference is marked as h. Then the real distanced changes with the time as follows:

$$d(t) = \begin{cases} \sqrt{s^2 + h^2 + (r-vt)^2}, & 0 \le t \le \dfrac{r}{v} \\ \sqrt{s^2 + h^2 + (vt-r)^2}, & \dfrac{r}{v} < t \le \dfrac{2r}{v} \end{cases} \quad (3)$$

According to the formula (1) provided by the Impinj Company, the time-varying change of the phase difference can be obtained as follows:

$$\theta(t) = \begin{cases} \left(-\dfrac{2\pi}{\lambda} \times 2\sqrt{s^2 + h^2 + (r-vt)^2} + \delta\right) \bmod 2\pi, & 0 \le t \le \dfrac{r}{v} \\ \left(-\dfrac{2\pi}{\lambda} \times 2\sqrt{s^2 + h^2 + (vt-r)^2} + \delta\right) \bmod 2\pi, & \dfrac{r}{v} < t \le \dfrac{2r}{v} \end{cases} \quad (4)$$

The θ(t) is solved to obtain the change rate of the phase difference with time as follows:

$$\theta(t) = \begin{cases} \left(\dfrac{4\pi}{\lambda} \dfrac{v(r-vt)}{\sqrt{s^2 + h^2 + (r-vt)^2}}\right) \bmod 2\pi, & 0 \le t \le \dfrac{r}{v} \\ \left(-\dfrac{4\pi}{\lambda} \dfrac{v(vt-r)}{\sqrt{s^2 + h^2 + (vt-r)^2}}\right) \bmod 2\pi, & \dfrac{r}{v} < t \le \dfrac{2r}{v} \end{cases} \quad (5)$$

The following situations can be obtained through the formula (5): when $$0 \le t \le \dfrac{r}{v},$$

the change rate (absolute value) of the phase difference with time is smaller and smaller and finally becomes 0.

When $$\dfrac{r}{v} < t \le \dfrac{2r}{v},$$

the change rate (absolute value) of the phase difference with time is greater and greater and starts changing from 0.

When s is greater, the change rate (absolute value) of the phase difference is smaller; and similarly, when the h is greater, the change rate (absolute value) of the phase difference is small.

The present embodiment provides an ultra high frequency RFID library book reservation method by using phases, including phase difference data collection of the receiving phases and the transmitting phases:

1. The RFID tag is adhered in a book, the RFID information is bound with the book information, and a binding result is stored in the database.

2. The antenna is moved according to a set speed, the information of the tag is collected in the moving process, including the ID information of the tag, phase difference information and time information. The collected tag information is represented by using triple Tag=(id, t, θ) in the present embodiment, wherein id represents the ID information of the current tag, t represents the collection time of the current tag, θ represents the collected phase difference information of the current tag. The antenna moves continuously, therefore a triple sequence is obtained in the collection process, that is, $Tag_1, Tag_2 \ldots Tag_n$.

3. The collected tag information, that is, a triple sequence is stored in the database for analysis and processing.

For a library using the RFID technology, when book reservation is performed, each layer of the bookshelf needs to be checked. When a certain layer of the bookshelf is checked, books on the upper and lower layers of the present layer and on the back bookshelf are read easily, the problems encountering in the book reservation are solved by using phases in the present embodiment.

1. The collected tag information, that is, the triple sequence is stored according to id, that is, different book information is distinguished at first, assuming that n different ids are collected, then n different data sets may be divided, and each data set represents the information of the same book.

2. The n data sets are separately preprocessed: due to the mutual interference among the tags and the multipath effect, the collected data have certain errors. The data in each data set are sorted according to time, the minimum time is separately subtracted from the time in the data set, and then the minimum time is set as 0, so the time changes starting from 0. The collected phase difference should satisfy a formula (4). The data are processed according to formula (4) to remove data with greater deviation with formula (4).

3. Smoothing processing is separately performed on the n preprocessed datasets: the objective of the smoothing processing is to remove the influence of Gaussian noise and make the change rule of the data better satisfy the actual conditions.

4. Phase difference calculation is separately performed on the n processed data sets: since the data in the data sets have been sorted according to the time sequence, with the first data set as an example, assuming that the data set contains m data, the change rate of the phase difference is calculated as follows:

$$\mathrm{var}_i = \dfrac{\theta_{i+1} - \theta_i}{t_{i+1} - t_i}, \quad 1 \le i \le m - 1 \quad (6)$$

5 maximum change rates are selected, and an average value is selected to serve as the phase change rate var of the data set.

(5) It can be discovered according to formula (5) that the phase difference change rates of the books on the upper and lower layers and on the back are smaller than the phase difference change rates of the books on the present layer, therefore the phase difference change rates of all the books are compared to distinguish the books needing to be reserved on a certain layer from the books on the upper and lower layers of the present layer and the back bookshelf so as to achieve the purpose of accurate book reservation. That is, when var> V, the book is the book on the present layer, or otherwise the book is the book in other layers. V is a threshold and is set as the arithmetic mean of the change rates of the phase differences of all the books on the present layer. The accurate book reservation of an ultra high frequency RFID library is realized through phases, which is beneficial for the further use of the ultra high frequency RFID technology in the field of libraries.

In the present embodiment, on the basis of accurately reserving the books on each layer, the books on each layer are sorted. The existing RFID library book reservation only checks each layer, and the checking granularity is each layer of the bookshelf; it is not enough in the library, the phases are used in the present embodiment, so that the checking granularity reaches each book, therefore the borrower can accurately obtain the position of each book, and the borrower can conveniently search the book, so that a lot of time of the borrower is saved.

The specific implementation process is as follows:

1. The time period with the minimum change rate is obtained according to the time-varying change rate of the phase difference of each book, and the median of the time period is obtained to serve as a time $T_1$ in the present embodiment.

2. Quadratic curve fitting is performed on the segment in which the phase difference change trend changes from increasing to decreasing in a phase difference change curve according to the data subjected to the preprocessing and the smoothing processing. The time $T_2$ where the highest point is located is calculated according to the fitted curve.

3. The time $T_3$ is obtained by using the formula (7) according to initial data, with the first data set as an example as well, the data set contains m data, and the time is the weighted average time of the phases:

$$T_3 = \sum_{i=1}^{m} \left( \frac{\theta_i}{\sum_{j=1}^{m} \theta_j} * t_i \right) \quad (7)$$

4. The weight coefficients $\alpha_1$, $\alpha_2$, $\alpha_3$ ($0<\alpha_1, \alpha_2, \alpha_3 1$) are used for determining the final time T, $T=\alpha_1*T_1+\alpha_2*T_2+\alpha_3*T_3$, $\alpha_1+\alpha_2+\alpha_3=1$. The books are sorted according to the time T; and smaller time indicates that the sequence of the book is earlier.

5. The weight coefficients $\alpha_1$, $\alpha_2$, $\alpha_3$, can be set according to actual conditions, when the antenna is large and a circular polarization mode is adopted, the values of $\alpha_1$, $\alpha_2$ can be set to be greater, the value of $\alpha_3$ can be set to be smaller, for example, for the Larid 9028 antenna, the weight coefficients are $\alpha_1=0.3$, $\alpha_2=0.65$, $\alpha_3=0.05$. When the antenna is small and when a linear polarization mode is adopted, the values of $\alpha_1$, $\alpha_2$ can be set to be smaller, the value of $\alpha_3$ can be set to be greater, for example, for a ceramic antenna with a side length of 8 cm, the weight coefficients are $\alpha_1=0.15$, $\alpha_2=0.05$, $\alpha_3=0.8$.

Figure 4:
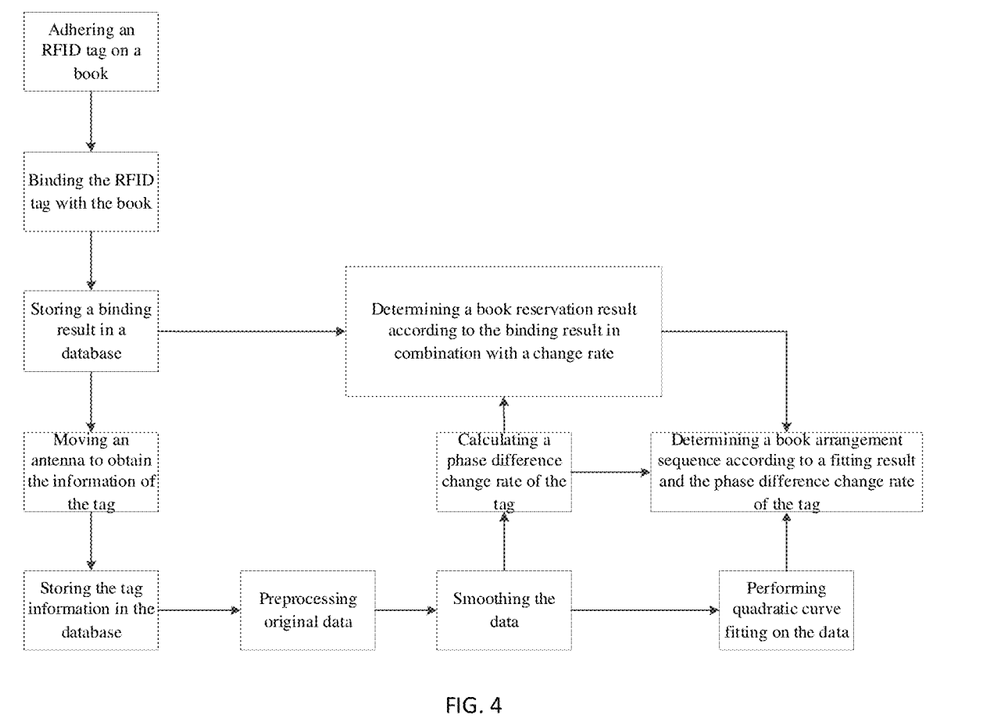
FIG. 4 is a flowchart of an embodiment.

The flowchart of phase-based library book reservation in the present embodiment is as shown in FIG. 4.

1. Scanning Book Tags

Assuming that a front bookshelf is divided into three layers, which are respectively a first layer, a second layer and a third layer from top to bottom; and the back bookshelf is also divided into three layers, which are a first layer, a second layer and a third layer from top to bottom. For the sake of convenient description, the first layer, the second layer and the third layer of the front bookshelf are respectively represented as $A_1$, $A_2$ and $A_3$, and the first layer, the second layer and the third layer of the back bookshelf are respectively represented as $B_1$, $B_2$ and $B_3$. It is assumed that each layer of $A_1$, $A_2$, $A_3$, $B_1$, $B_2$ and $B_3$ has 30 books.

In each book, the RFID tag is adhered on the book, and the books are placed neatly on each layer of the bookshelf in a normal way. The RFID tag information is bound with the book information, and the binding result is stored in the database; therefore, the one-to-one correspondence of the RFID tags and the books can be guaranteed, and when the RFID tag information is read, the corresponding book information can be determined. The RFID tag is also adhered in each layer of the bookshelf and is called as a layer tag for marking each layer of the bookshelf; when a new book is shelved, the layer tag is bound with the books of the layer, and the binding result is stored in the database; and when the RFID layer tag is read, how many books the layer should contain can be obtained from the database.

Assuming that the antenna of the reader aligns to the layer $A_2$, the vertical distance between the antenna T and $A_2$ is 35 cm, the antenna moves at a speed of 0.1 m/s, and the vertical distance between the antenna and the $A_2$ is always unchanged in the moving process, that is, the antenna T is always moving in parallel to the bookshelf.

The flow of the library book reservation is as follows: reading the layer tag, and obtaining how many books the layer should contain from the database, namely a query result; moving the reader antenna to scan the tag to obtain a scanning result; comparing the scanning result with the query result to obtain a book reservation result: correct book, wrong bookshelf book and lost book; the wrong bookshelf book refers to that the book is not the book on the layer and is placed on the layer by mistake; and the lost book refers to the book that should be placed on the present layer but is not found during the book reservation.

The reader antenna firstly reads the layer tag of the layer $A_2$, and obtains the query result from the database; and the reader antenna scans the book while moving to obtain the scanning result. The information of the tag is obtained: ID information of the tag, phase difference information and time information and the like. Due to the wide identification range of the ultra high frequency RFID technology and the indoor multipath effect, the books on other bookshelves and books on other layers of the present bookshelf are read easily during the library book reservation. At this time, the scanning result contains the books of the other layers: $A_1, A_2, A_3$, $B_1, B_2$ and $B_3$, therefore, when the scanning result is directly compared with the query result, the obtained book reservation result is obviously incorrect.

2. Processing the Scanning Result (1) Preprocessing the scanning result: a part of data is eliminated according to the change rule in FIG. 2.

(2) Smoothing processing is performed on the preprocessed data.

(3) The data subjected to the smoothing processing are classified according to the ID information of the tags and are sorted according to the time sequence; and as the tags are in one-to-one correspondence with the book information, therefore the time-varying change rate of the phase difference of each book can be calculated.

(4) Obtaining the book reservation result

The change rates of the tags are analyzed and processed; and as the antenna moves at a constant speed, the farther the distance from the antenna is, the smaller the average change rate of the phase difference with time is. As the antenna aligns to the layer $A_2$, the distance between the antenna T and the books on the layer $A_2$ is the minimum, and the average change rate of the phase difference with time is the maximum. The phase differences of all the books are analyzed and compared, the books on the layer $A_2$ can be distinguished from the books on the layers $A_1, A_3, B_1, B_2$ and $B_3$, then the books beyond the layer $A_2$ are eliminated from the scanning result to obtain a new scanning result, the new scanning result is compared with the query result to obtain the book reservation result, and thus the book reservation objective is achieved.

3. Smaller Granularity Book Reservation

The existing RFID library book reservation only checks each layer, and the checking granularity is each layer of the bookshelf; it is not enough in the library, the phases are used in the present embodiment, so that the checking granularity reaches each book, therefore the borrower can accurately obtain the position of each book, and the borrower can conveniently search the book, so that a lot of time of the borrower is saved.

(1) The time period with the minimum change rate is obtained according to the time-varying change rate of the phase difference of each book, and the median of the time period is obtained to serve as a time $T_1$ in the present embodiment.

(2). Quadratic curve fitting is performed on the segment in which the phase difference change trend changes from increasing to decreasing in a phase difference change curve according to the data subjected to the preprocessing and the smoothing processing. The time $T_2$ where the highest point is located is calculated according to the fitted curve.

(3). The phase weighted average time $T_3$ is obtained according to formula (7).

(4). The final time is determined by using the weight coefficients $\alpha_1$, $\alpha_2$, $\alpha_3$:

$$T=\alpha_1*T_1+\alpha_2*T_2+\alpha_3*T_3$$

(5). According to the time T, the books are sorted: the smaller the time is, the earlier the sequence of the books is. Therefore, library book reservation is performed on each book instead of the previous one layer.

The present invention provides a library book reservation method based on ultra high frequency RFID technology, there are many ways and means for implementing the technical solutions, the foregoing descriptions are merely preferred implementation of the present invention, it should be noted that, for those of ordinary skill in the art, various improvements and modifications can be made without departing from the principle of the present invention, and these improvements and modifications shall also fall within the protection scope of the present invention. The components that are not clearly defined in the present embodiment can be implemented by the prior art.

What is claimed is:

1. A library book reservation method based on ultra high frequency RFID technology, wherein the ultra high frequency RFID technology comprises RFID tags, an RFID antenna and an RFID reader, one RFID tag adhered on one book that has an ID which is stored in an ID database, the RFID antenna is a device for receiving and transmitting signals between the RFID tags and the RFID reader; the ID database is available for the RFID reader; the library book reservation method comprises the following steps:

step 1, using an RFID tag adhered on each book by using an RFID reading device, wherein the information read by the RFID reader initiating a movement of the antenna at a preset speed while the antenna transmits electromagnetic waves, which have transmitting phases, and receives reflected electromagnetic waves, which have receiving phases, from the RFID tags, a phase difference between a transmitting phase and a receiving phase for each RFID tag is referred as θ; the RFID reader collecting phase difference θ, recording time t when the phase difference θs being collected; an information for each RFID tag at one time point is referred as a triple Tag, the triple Tag has id, t and, θ; all available triple Tags are collected at multiple time points;

step 2, dividing, by the RFID reader, the triple Tags into different subsets according to different id; for each subset, obtaining a minimum value of the time t of the triple Tags, subtracting the minimum value from the time t in each triple Tag, obtaining time differences, and sorting the triple Tags from smallest to largest based on to the time differences in the each subset; and step 3, obtaining a change rule of the phase difference θs for the RFID tags, establishing a model, analyzing position relation between the RFID antenna and all available RFID tags which generates a dataset for locations of the books in bookshelves.

2. The library book reservation method based on the ultra high frequency RFID technology of claim 1, wherein step 3 comprises:

step 3-1, for the triple Tags in each sorted subset, calculating change rates of phase differences in sequence, selecting A phase differences having a maximum change rate, wherein A is a natural number, and using an arithmetic mean of the change rates of the A phase differences as the phase difference change rate of the subset, that is, the ID information of the RFID tag is the phase difference change rate of the RFID tag;

step 3-2, calculating the phase difference change rates of all the subsets, when the phase difference change rate is smaller than a set threshold, dividing the belonging book as the book in other layers of a bookshelf, eliminating the book, otherwise, dividing the book as the book in the present layer, and retaining the book;

step 3-3, in the divided present layer book data, for each subset, obtaining a time period in which the phase difference change rate is smaller than the set threshold according to the phase difference change rates, and using a median of the time period as a time T1;

step 3-4, for the data in each subset, for the segment of the phase difference which increases with time, the value changes from increasing to decreasing, that is, the phase difference progressively increases from 0 to the maximum value of P, and then progressively decreases from the maximum value of P to 0, wherein $P \in (0, 2\pi)$, performing quadratic curve fitting by using the least square method, and calculating the time T2 where the highest point is located according to the fitted curve;

step 3-5, for all the triple Tags in each subset, calculating a weighted average time T3 of the phases;

step 3-6, determining the final time T by using weight coefficients α1, α2, α3:

$$T=\alpha1*T1+\alpha2*T2+\alpha3*T3,$$

$$\alpha1+\alpha2+\alpha3=1,$$

wherein, 0<α1, α2, α3<1, the books are sorted according to the time T, and the book having the minimum value of the time T is arranged at the headmost, and then the books are sorted according to the T values from small to large.

3. The library book reservation method based on the ultra high frequency RFID technology of claim 1, wherein searching a specific book by activating the RFID reader to generating the dataset for locations of the books in the bookshelves, matching the ID of the specific book in the ID database and the dataset; the specific book is not available if the ID of the specific book is not in the dataset.

* * * * *